Figure 1:
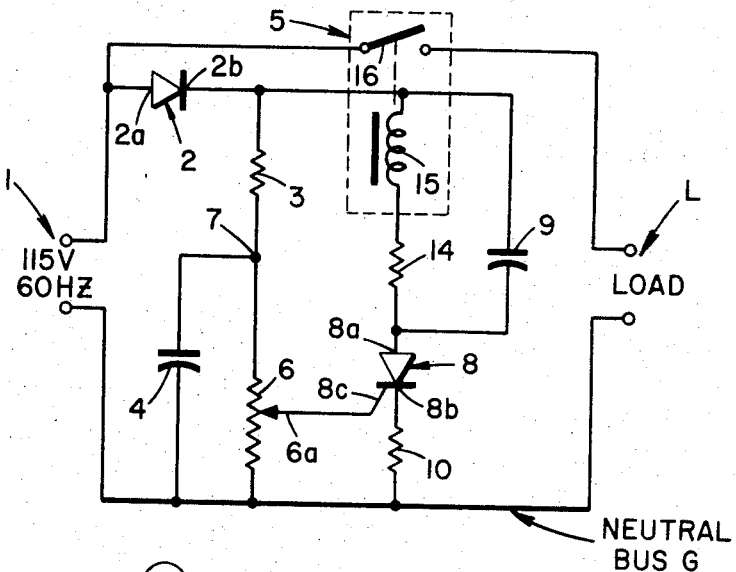
Figure 2:
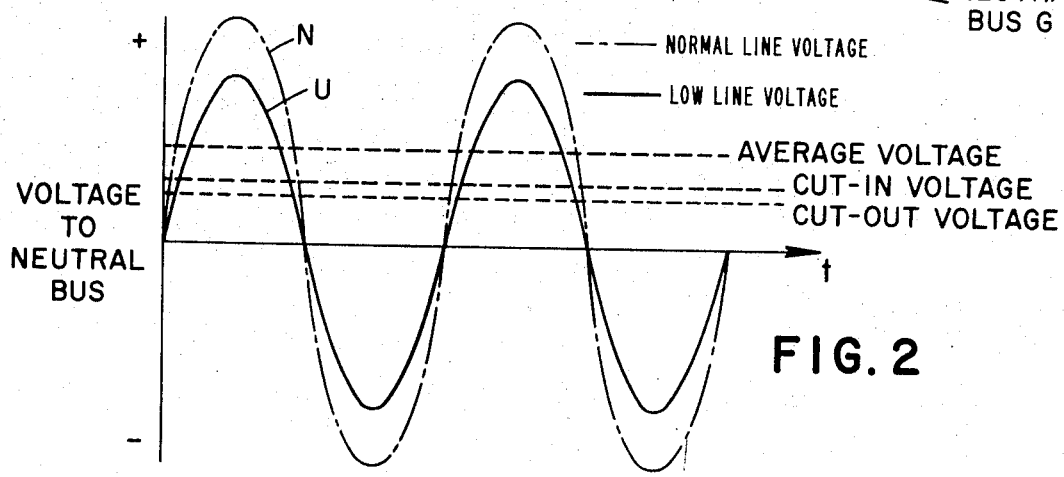
Figure 3:
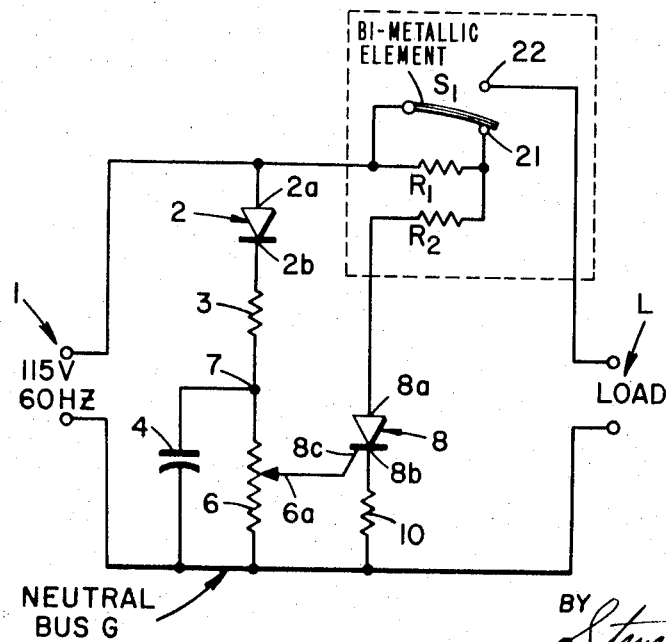

United States Patent [19]
Conti et al.

[11] 3,718,839
[45] Feb. 27, 1973

[54] UNDER-VOLTAGE PROTECTION DEVICE

[76] Inventors: Donald J. Conti, 626 Bergen Boulevard, Ridgefield, N.J. 07657; Thomas L. Reilly, 66 Raymond Avenue, Nutley, N.J. 07110

[22] Filed: July 30, 1971

[21] Appl. No.: 167,591

[52] U.S. Cl..............317/31, 317/33 SC, 317/154, 317/148.5 B
[51] Int. Cl..............................................H02h 3/24
[58] Field of Search......317/31, 33 SC, 132, 148.5 B, 317/154

[56] References Cited

UNITED STATES PATENTS

| | | |
|---|---|---|
| 3,313,984 | 4/1967 | Hupp..................................317/31 X |
| 3,335,325 | 8/1967 | Elpers.................................317/31 |
| 3,428,864 | 2/1969 | Barber et al........................317/31 |
| 3,302,064 | 1/1967 | Redmond..........................317/31 X |
| 3,143,640 | 8/1964 | Becker..............................317/132 |
| 2,779,852 | 1/1957 | Weber.............................317/132 X |

*Primary Examiner*—James D. Trammell
*Attorney*—Stevens, Davis, Miller & Mosher

[57] ABSTRACT

An under-voltage protection device including an A.C. source connected across a load; a series combination of a line switch and a control rectifier connected between the A.C. source and the load; and a series combination of a rectifier and voltage divider connected across the A.C. source; wherein the control electrode of the control rectifier is connected to an adjustable terminal of the voltage divider.

9 Claims, 3 Drawing Figures

INVENTORS
DONALD J. CONTI
THOMAS L. REILLY

BY Stevens, Davis, Miller & Mosher
ATTORNEYS

UNDER-VOLTAGE PROTECTION DEVICE

This invention relates to an under-voltage protective circuit and particularly to such a circuit for protection against under-voltage of any phase of a multiphase or single phase alternating current source.

In multiphase alternating current systems, it may be desirable that the voltage magnitude of each phase be maintained above a predetermined level, or that the voltage magnitudes of all phases be maintained equally above a predetermined level. If the voltage magnitude of any phase falls below a predetermined level, it is desirable to indicate this condition so that steps can be taken to correct the condition or to take other action.

In single phase systems, it may be desirable that the voltage be maintained above a predetermined level. If the voltage falls below the predetermined level, it may be desirable to indicate this condition so that steps may be taken.

Accordingly, an object of this invention is to provide an improved circuit that senses the under-voltage of any individual phase of a multiphase or single phase alternating current source.

Another object of the invention is to accurately sense line voltage and ignore short term low line excursions.

Another object of the invention is to remove voltage from the load when it is below the desired level.

Another object of the invention is to provide a differential trip voltage, (Hysterisis) which ignores short term high line excursions thereby eliminating false load reactivation.

Another object of the invention is to provide an inexpensive under-voltage protective device.

Another object of the invention is to provide an improved circuit for sensing the under-voltage of a single phase.

Briefly, these and other objects of the invention are achieved by rectifying the voltage of the alternating current source, and supplying these rectified voltages in a filtered form to a voltage divider. The voltage divider sets a level at which the sensing rectifier provides an indication which may be utilized as desired.

The invention is particularly pointed out in the claims. The invention may be better understood from the following description given in connection with the accompanying drawing, in which:

FIG. I – shows a schematic diagram of a preferred embodiment of an under-voltage sensing circuit in accordance with the invention;

FIG. II – shows waveforms for explaining the operation of the sensing circuit; and FIG. III – shows a schematic diagram of a second preferred embodiment of the present invention.

The embodiment in FIG. I is shown being used with a conventional A.C. power source 1. The anode 2a of rectifier 2 is coupled to voltage source 1 and the cathode 2b of rectifier 2 is connected to the filter complex embodied by resistor 3 and capacitor 4; cathode 2b is also connected to the switching means 5 (such as a relay). In this embodiment, switching means 5 consists of a relay coil 15 and associated switch contact 16. The rectifier 2 thus derives or provides at its output a rectified unfiltered voltage that has an instantaneous magnitude which is indicative of the lowest instantaneous voltage magnitude present at the source 1.

The sensing potentiometer 6 is coupled between the common connection 7 and the neutral bus G. The sensing potentiometer 6 includes a movable tap 6a which provides an adjustable magnitude of the rectified filtered voltage at 7. The tap 6a which is included in a differential trip voltage (Hysterisis) circuit, is coupled to the gate electrode of a control rectifier 8. The capacitor 4 is coupled between the junction 7 and the neutral bus G. The anode 8a of the control rectifier 8 is coupled to one side of relay coil 15. The other side of coil 15 is coupled to the positive terminal of a source of unidirectional or direct current potential. The negative terminal of the source of potential is coupled to the neutral bus.

As shown in FIG. I, the source of direct current potential consists of the potential supplied by the A.C. source 1, rectified by rectifier 2. Thus, in this embodiment, the said other side of coil 15 is coupled to the cathode 2b of rectifier 2.

A capacitor 9 is connected between the cathode 2b of rectifier 2 and the anode 8a of control rectifier 8. If the switching means 5 is a D.C. relay, the capacitor 9 serves to eliminate relay chatter.

If the control rectifier 8 is a silicon controlled rectifier, the rectifier 8 conducts anode-cathode current when a suitable current flows between its gate or control electrode 8c and its cathode 8b. When such a current flows, anode-cathode current may flow through the control rectifier 8 to energize the switching means 5 which causes a set of normally open contacts 16 associated with the relay coil 15 to close, thereby supplying power to the load L. When the anode-cathode current does not flow, relay coil 15 is de-energized, a condition which permits the contacts 16 to open. The opened or closed condition of the contacts 16 can be utilized in any way desired, for example, removing voltage from a load. Resistor 10 is connected between the cathode 8b of the control rectifier 8 and the neutral bus G. This resistor serves to establish a pedestal voltage which modifies the control rectifier trip voltage in such a way as to introduce a differential or hysterisis in the switching means.

The operation of the circuit shown in FIG. I will be explained in connection with the waveforms shown in FIG. II. The voltage in FIG. II is shown under two conditions; namely the normal condition shown by the dashed line curve N, and a lower or under-voltage condition shown by the solid line curve U. The setting for the trigger voltage at the cathode of the rectifier 8 is indicated by the dashed line labelled "cut-in voltage" which is on the positive side of the zero axis. The movable tap 6a of the sensing potentiometer 6 is set for the normal condition where the voltage has a magnitude which is at the desired level. Capacitor 4 thus operates to hold the highest positive voltage imposed upon it, which voltage is proportional to the highest positive peaks of the highest voltage of the power source 1. Changes in the D.C. voltage at 7 are approximately in proportion to changes in the A.C. value of the power source. The current flowing between the control electrode 8c and the cathode 8b of the control rectifier 8 causes anode-cathode current to flow through the control rectifier 8. This current energizes the switching means and the contacts 16 of the relay 5 are closed. This condition exists at all times if the divided average voltage is above the predetermined cut-in voltage level and this condition also exists during short term line excursions (transients).

An example of an under-voltage condition is shown in FIG. II, it being assumed that the voltage magnitude has dropped for some reason as indicated by the solid line curve. Under this condition, the average voltage magnitude on the common connection 7 and on the movable tap 6a of the sensing potentiometer 6 is lower than normal at certain times. Thus, the voltage at movable tap 6a drops below the cut-off voltage for the control rectifier 8 for a sufficient period to overcome the aforementioned hysterisis effect to stop the flow of control electrode-cathode current, thereby cutting off the flow of anode-cathode current. With no control electrode-cathode current, the control rectifier 8 stops conducting, the switching means 5 is de-energized, and the contacts 16 are opened. The open contacts 16 thus provide an indication that the voltage magnitude has fallen below the predetermined reference voltage level. This indication can be utilized in any way desired.

A second preferred embodiment shown in FIG. III discloses an alternate switching means to that of the relay of the embodiment shown in FIG. I; in this second embodiment, a bi-metallic strip functions as a single pole double throw switch in conjunction with two heating resistors. In describing the embodiment of FIG. III below, the same reference numerals are utilized, where appropriate, to describe components common to the embodiment of FIG. I.

Resistors $R_1$ and $R_2$ derive their power from the control rectifier 8 and produce the thermal energy required to enable the mechanical motion of the switching element to contact the normally open terminal of $S_1$ and supply power to the load.

When the device is un-energized, the bi-metallic switching element $S_1$ is in the normally closed position in contact with contact 21 and shorts resistor $R_1$. When the under-voltage protective device is connected to a voltage source 1 whose voltage is greater than the circuit trip voltage, control rectifier 8 is energized and conducts. Its current is limited only by resistor $R_2$; hence resistor $R_2$ heats up rapidly and supplies the thermal energy necessary to quickly bend the bi-metallic element toward the normally open contact 22 of $S_1$. During this time, resistor $R_1$ is switched into the circuit in series with $R_2$ and reduces the current in the control rectifier 8 to some value necessary to just hold the bi-metallic element in he normally open position with the thermal energy available in both $R_1$ and $R_2$. It may therefore be said that the initial shorting of $R_1$ provides and insures the rapid application of power to the load L and insures that excessive heat is not sustained through $S_1$; however, excessive heat is not sustained after initiation, due to the introduction of $R_1$ and the subsequent reduction in the control rectifier current.

In addition, the thermal time constant of the $R_1$, $R_2$ and $S_1$ complex intrinsicly provides additional hysterisis thereby contributing to switching stability. Therefore, the embodiment shown in FIG. III will perform in the same general manner as the circuit of FIG. I even if resistor 10 were removed and the cathode 8b of the control rectifier 8 was connected to the neutral bus G.

In either above-described embodiments, the A.C. supply 1 could be the secondary of a transformer with a primary winding connected from one of the input voltage phases to neutral. Also, instead of the controlled rectifier 8, a transistor could be readily used as the current sensing element.

Finally, it should be mentioned that the invention can be utilized with other systems besides the systems shown in FIGS. I and III; therefore, while the invention has been described with reference to particular preferred embodiments, it is to be understood that modifications may be made without departing from the spirit of the invention or from the scope of the claims.

What is claimed is:

1. An under-voltage protection device, comprising: an A.C. voltage source having first and second terminals connected across a load; switching means connected in series with said source and said load for making and breaking an electrical connection therebetween; means rectifying said A.C. voltage; means filtering said rectified A.C. voltage; voltage dividing means connected to the output of said filter means; means actuated by a current passing therethrough for controlling said switching means; a control rectifier having an anode, a cathode and a control electrode; a series combination of said switch control means and said control rectifier connected between the output of said rectifying means and said A.C. voltage source; wherein said control electrode is connected to an adjustable terminal of said voltage divider.

2. An under-voltage protection device according to claim 1, wherein the input of said rectifying means is connected to said first terminal; said filtering means is connected between the output of said rectifying means and said second terminal; said voltage dividing means is connected between the output of said filtering means and said second terminal; and said series combination is connected between the output of said rectifying means and said second terminal.

3. An under-voltage protection device according to claim 1, wherein said series combination further comprises a resistance connected between said cathode and said A.C. source, said anode being connected to said A.C. voltage source through said switch control means and said rectifying means.

4. An under-voltage protection device according to claim 1, wherein said rectifying means comprises a diode, the anode of said diode being connected to said first terminal of said A.C. voltage source; said filtering means comprises a series combination of a resistor and capacitor connected between the cathode of said diode and said second terminal of said A.C. voltage source; said voltage divider is connected in parallel with said capacitor; said switch control means comprises a relay coil; a first terminal of said relay coil is connected to the cathode of said diode, a second terminal of said relay coil is connected in series with a resistor to the anode of said control rectifier and the cathode of said control rectifier is connected through a resistor to said second terminal of said A.C. source.

5. An under-voltage protection device according to claim 4, further comprising a capacitor connected across the series combination of said relay coil and resistance.

6. An under-voltage protection device, comprising: an A.C. voltage source having first and second terminals connected across a load; switching means connected in series with said source and said load for making and breaking an electrical connection therebetween; means rectifying said A.C. voltage; means filtering said rectified A.C. voltage; voltage dividing means connected to the output of said filter means; means actuated by a current passing therethrough for controlling said switching means; a control rectifier having an anode, a cathode and a control electrode; a series combination of said switch control means and said control rectifier connected between said first and second terminals of said A.C. voltage source; wherein said control electrode is connected to an adjustable terminal of said voltage divider.

7. An under-voltage protection device according to claim 6, wherein said switching means comprises a bi-metallic element; and further comprising means for heating said bi-metallic element to make and break said electrical connection between said source and said load.

8. An under-voltage protection device according to claim 7, wherein said heating means comprises a first resistance connected between said anode and said A.C. source.

9. An under-voltage protection device according to claim 8, further comprising a second resistance connected in series with said first resistance; said bi-metallic element having at least one contact connected to said second resistance.

* * * * *